(12) United States Patent
Reed et al.

(10) Patent No.: US 10,073,787 B2
(45) Date of Patent: Sep. 11, 2018

(54) DYNAMIC POWERING OF CACHE MEMORY BY WAYS WITHIN MULTIPLE SET GROUPS BASED ON UTILIZATION TRENDS

(71) Applicant: VIA ALLIANCE SEMICONDUCTOR CO., LTD., Shanghai (CN)

(72) Inventors: Douglas R. Reed, Austin, TX (US); Rodney E. Hooker, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 104 days.

(21) Appl. No.: 15/280,779

(22) Filed: Sep. 29, 2016

(65) Prior Publication Data

US 2017/0300418 A1    Oct. 19, 2017

Related U.S. Application Data

(60) Provisional application No. 62/323,859, filed on Apr. 18, 2016.

(51) Int. Cl.
*G06F 12/08* (2016.01)
*G06F 12/128* (2016.01)
(Continued)

(52) U.S. Cl.
CPC ...... *G06F 12/0864* (2013.01); *G06F 12/0862* (2013.01); *G06F 12/128* (2013.01); *G06F 1/32* (2013.01); *G06F 12/0804* (2013.01); *G06F 12/0846* (2013.01); *G06F 2212/1016* (2013.01); *G06F 2212/1028* (2013.01);
(Continued)

(58) Field of Classification Search
None
See application file for complete search history.

(56) References Cited

U.S. PATENT DOCUMENTS

2006/0156048 A1    7/2006    Hines et al.
2008/0077764 A1    3/2008    Pierce et al.
(Continued)

FOREIGN PATENT DOCUMENTS

WO    WO0182085        11/2001
WO    WO2014164328    10/2014

OTHER PUBLICATIONS

Sen, Rathijit et al. "Cache Power Budgeting for Performance". Technical Report 1791, University of Wisconsin-Madison Department of Computer Sciences, Apr. 2013. pp. 1-11.
(Continued)

*Primary Examiner* — Denise Tran
(74) *Attorney, Agent, or Firm* — McClure, Qualey & Rodack, LLP

(57) ABSTRACT

A set associative cache memory comprises an M×N memory array of storage entries arranged as M sets by N ways, both M and N are integers greater than one. Within each group of P mutually exclusive groups of the M sets, the N ways are separately powerable. A controller, for each group of the P groups, monitors a utilization trend of the group and dynamically causes power to be provided to a different number of ways of the N ways of the group during different time instances based on the utilization trend.

18 Claims, 7 Drawing Sheets

(51) Int. Cl.
*G06F 1/32* (2006.01)
*G06F 12/0864* (2016.01)
*G06F 12/0862* (2016.01)
G06F 12/0804 (2016.01)
G06F 12/0846 (2016.01)

(52) U.S. Cl.
CPC .. *G06F 2212/601* (2013.01); *G06F 2212/602* (2013.01); *G06F 2212/6032* (2013.04); *G06F 2212/69* (2013.01); *Y02D 10/13* (2018.01)

(56) References Cited

U.S. PATENT DOCUMENTS

| | | | |
|---|---|---|---|
| 2008/0082753 A1* | 4/2008 | Licht | G06F 12/0864 711/128 |
| 2014/0122824 A1* | 5/2014 | Lewsey | G06F 12/02 711/170 |
| 2014/0297959 A1 | 10/2014 | Shiu et al. | |
| 2015/0309939 A1 | 10/2015 | Sadoughi-Yarandi et al. | |

OTHER PUBLICATIONS

Li, Chuanpeng et al. "Managing Prefetch Memory for Data-Intensive Online Servers" FAST '05: 4th USENIX Conference on File and Storage Technologies. USENIX Association. Nov. 18, 2005 pp. 253-266.

* cited by examiner

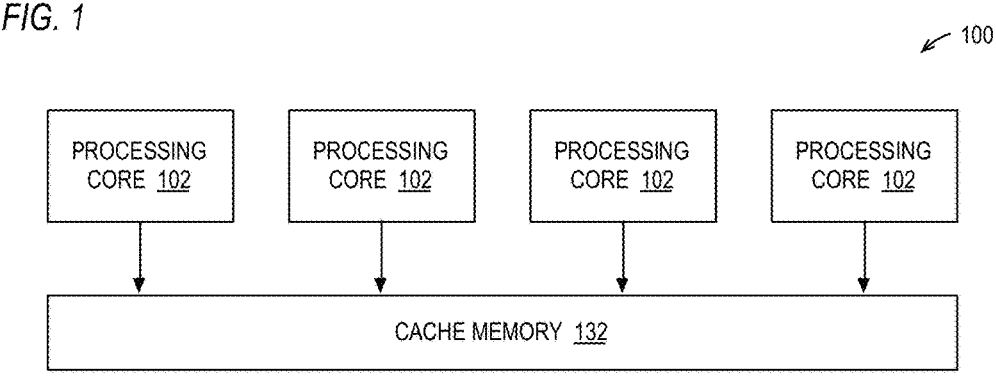
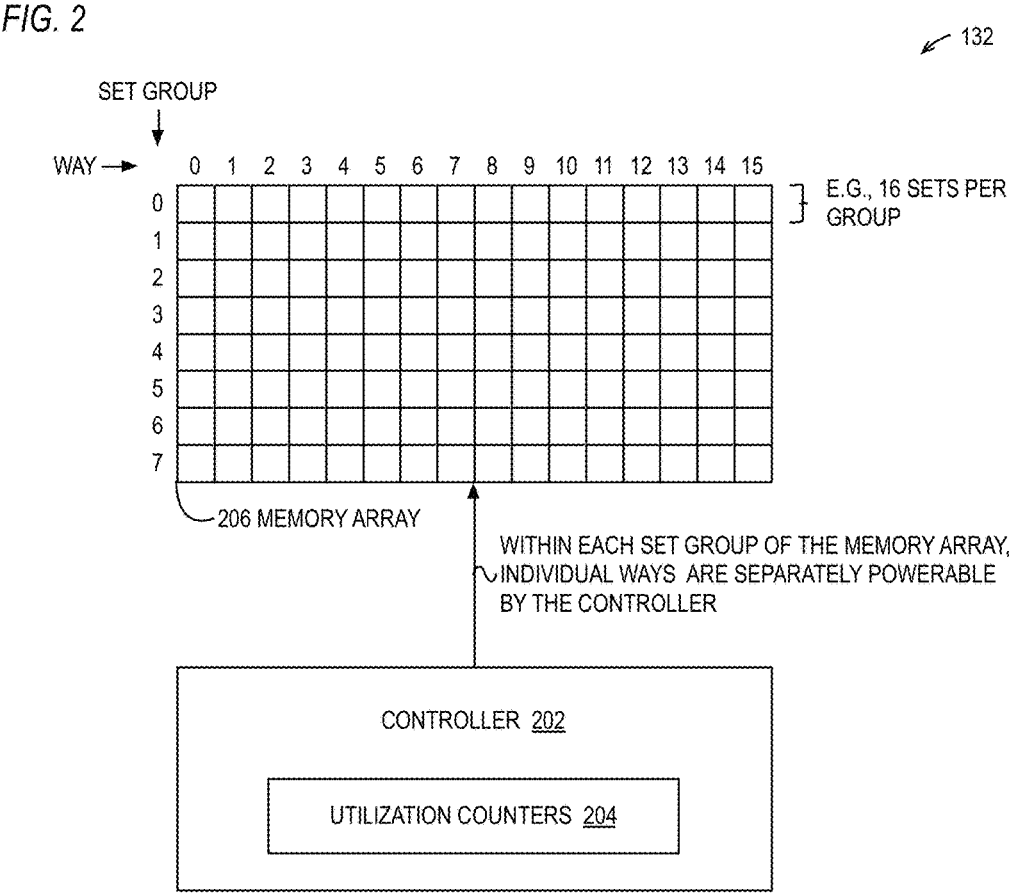

FIG. 4
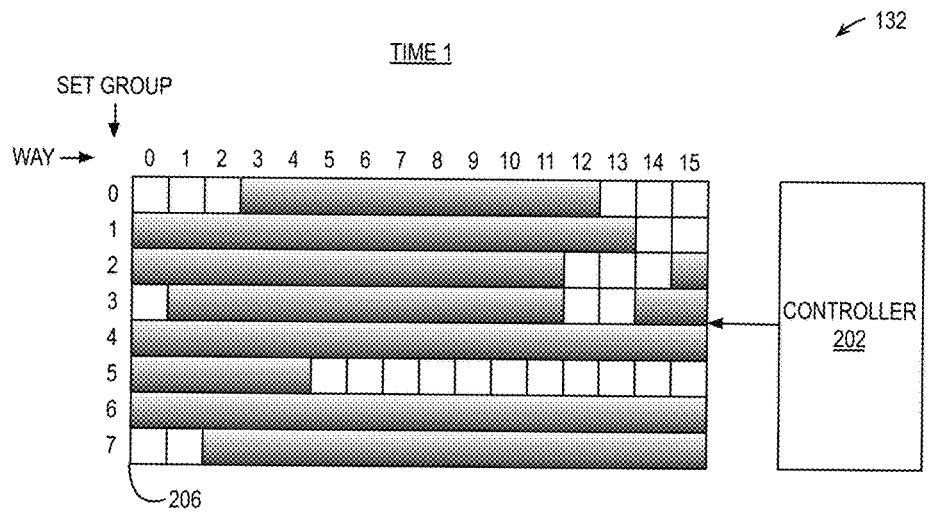
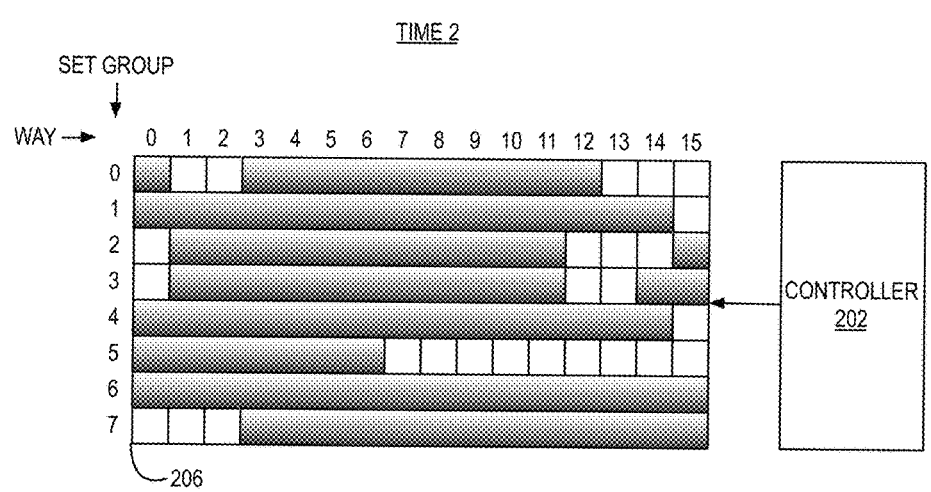
☒ = POWERED ON    ☐ = POWERED OFF

DYNAMIC POWERING OF CACHE MEMORY BY WAYS WITHIN MULTIPLE SET GROUPS BASED ON UTILIZATION TRENDS

CROSS REFERENCE TO RELATED APPLICATION(S)

This application claims priority based on U.S. Provisional Application Ser. No. 62/323,859, filed Apr. 18, 2016, entitled DYNAMIC POWERING OF CACHE MEMORY BY WAYS WITHIN MULTIPLE SET GROUPS BASED ON UTILIZATION TRENDS, which is hereby incorporated by reference in its entirety.

BACKGROUND

A processor is a digital device that executes instructions specified by a computer program. A typical computer system includes a processor coupled to a system memory that stores program instructions and data to be processed by the program instructions. The performance of such a system is hindered by the fact that the time required to read data from the system memory into the processor or to write data from the processor to the system memory is typically much larger than the time required for the processor to execute the instructions that process the data. The time difference is often between one and two orders of magnitude. Thus, the processor may be sitting idle with nothing to do while waiting for the memory to be read or written.

However, processor designers recognized long ago that programs tend to access a relatively small proportion of the data a relatively large proportion of the time, such as frequently accessed program variables. Programs with this characteristic are said to display good temporal locality, and the propensity for this characteristic is referred to as the locality of reference principle. To take advantage of this principle, modern processors typically include one or more cache memories. A cache memory, or cache, is a small memory relative to system memory size and electrically close to the processor core that temporarily stores a subset of data that normally resides in the larger, more distant memories of the computer system, such as the system memory. Caching data is storing data in a storage element of a cache memory so that the data can be subsequently more quickly provided from the cache memory than from a more distant memory of the system.

When the processor executes a memory read instruction, such as a load or pop instruction, the processor first checks to see if the requested data is present in the cache, i.e., if the memory read address hits in the cache. If not, i.e., if the memory read address misses in the cache, the processor fetches the data into the cache, typically in addition to loading it into the specified register of the processor. Now since the data is present in the cache, the next time a memory read instruction is encountered that requests the same data, the data can be fetched from the cache into the register for processing, rather than from system memory. The memory read instruction can be executed essentially immediately since the data is already present in the cache.

A cache stores data in cache lines, or cache blocks. A cache line is the smallest unit of data than can be transferred between the cache and the system memory. An example of a cache line size is 64 bytes of data. When a memory read instruction causes a cache miss, an entire cache line implicated by the missing address is fetched into the cache, instead of only fetching the data requested by the memory read instruction. Consequently, subsequent memory read instructions that request data in the same cache line may be quickly executed because the data can be supplied from the cache rather than having to access system memory.

In addition, when a memory write instruction is executed, such as a store or push instruction, if the memory write address hits in the cache, the data may be immediately written into the cache line of the cache, thereby allowing the write of the data to system memory to be deferred. Later, the cache will write the cache line to system memory, typically in order to make room for a newer cache line. This operation is commonly referred to as a writeback operation. Still further, some caches also allocate an entry in the cache when a memory write address misses in the cache. That is, the cache performs a writeback operation of an old cache line in an entry of the cache, and reads the new cache line implicated by the write address from system memory into the cache entry formerly occupied by the old cache line. This operation is commonly referred to as a write allocate operation.

As may be observed, an efficiently performing cache may greatly improve the performance of the processor. Additionally, in many cases, cache memories have come to represent a significant proportion of the power consumption of a processor, particularly when the cache memory is large, such as a last-level cache memory in the cache memory hierarchy of the processor. It is also desirable to reduce the amount of power consumed by the cache memory, which is often a competing goal with the goal of improving the performance of the processor.

BRIEF DESCRIPTION OF THE DRAWINGS

FIG. 1 is a block diagram illustrating a processor.

FIG. 2 is a block diagram illustrating in more detail the cache memory of FIG. 1.

FIG. 4 is a block diagram illustrating an example of the operation of the cache memory of FIG. 2 to perform selective powering of ways of groups of sets according to the flowchart of FIG. 3.

DETAILED DESCRIPTION OF THE EMBODIMENTS

Figure 3:
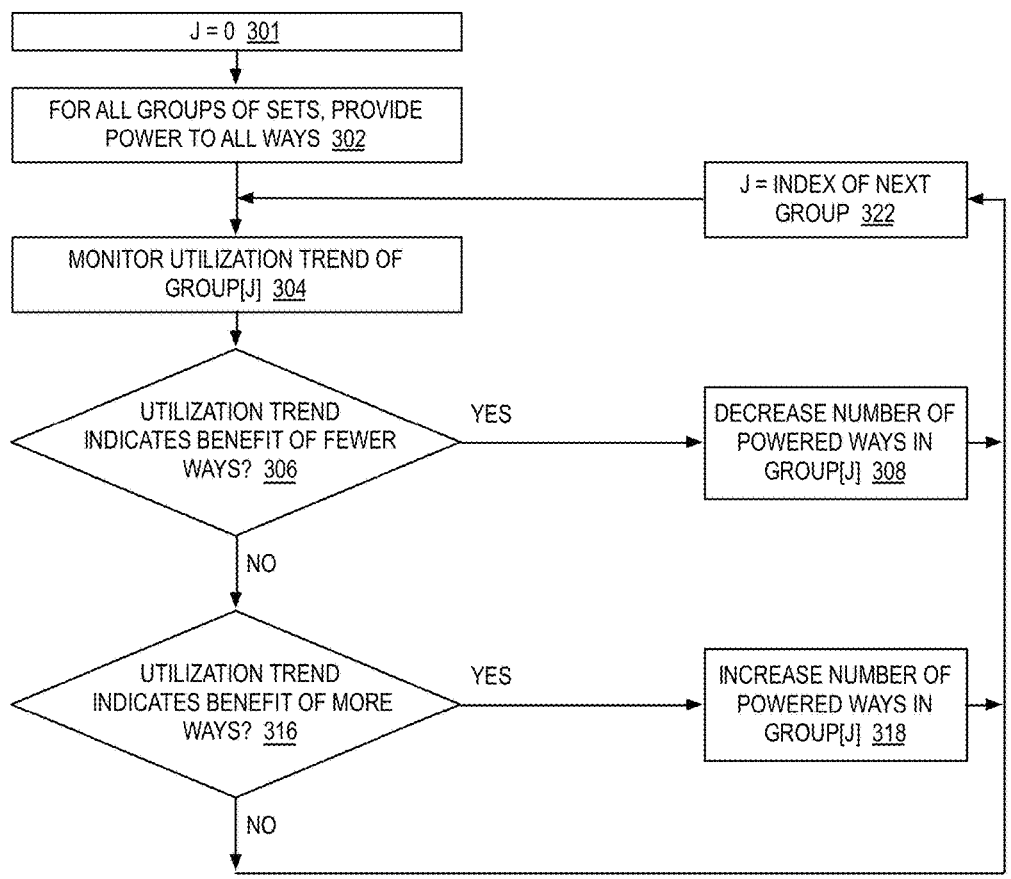
FIG. 3 is a flowchart illustrating operation of the cache memory of FIG. 2 to perform selective powering of ways of groups of sets.

Embodiments are described in the present disclosure of a set-associative cache memory that groups its sets into a plurality of set groups and in which, within each set group, the number of ways that are powered-up or powered-down may be dynamically changed during operation of the cache memory in order to provide a desirable balance between the cache memory's performance and power consumption. That is, the cache memory removes power from some of the ways of a set group at times and provides power to some of the ways of a set group at times, and the number of ways to which the cache memory removes/provides power is determined on a dynamic basis. The cache memory includes a controller that monitors utilization trends of the different set groups of the cache memory in order to make decisions regarding when to increase or reduce the number of ways of each set group that are powered-up. The utilization trends include, but are not limited to, one or a combination of hit rate, average victim cache line age, number of cache lines prefetched but not used, and/or access frequency.

Removing power from a way of a group of sets of a cache memory in the present disclosure means either removing power altogether or at least removing power such that the state of the storage cells in the way of the group is lost or at least unreliable. This is in contrast to other power-saving techniques in which the power provided to storage cells is reduced, perhaps resulting in reduced performance, but sufficient power is provided to retain the state of the storage cells. Conversely, providing power to a way of a group of sets of a cache memory in the present disclosure means providing sufficient power to retain the current state of the storage cells.

Referring now to FIG. 1, a block diagram illustrating a processor 100 is shown. The processor 100 includes a plurality of processing cores 102 all coupled to and sharing a cache memory 132. Preferably, each core 102 also includes its own lower-level cache memories, e.g., level-1 (L1) instruction cache memory and L1 data cache memory and the cache memory 132 is a last-level cache (LLC) of the processor 100. Additionally, the processor 100 may include intermediate-level cache memories, e.g., level-2 (L2) caches, which may be local to a core 102 or shared by two or more cores 102. Embodiments are contemplated in which the cache memory that is configured to dynamically power the number of ways within set groups based on utilization trends is a lower/intermediate-level cache memory rather than a LLC. Furthermore, although an embodiment of a processor is described with respect to FIG. 1 of a multi-core processor in which the multiple cores share a cache memory, other embodiments are contemplated in which multiple cores do not share the cache memory that is configured to dynamically power the number of ways within set groups based on utilization trends, which is instead dedicated to a core 102, which may be a single core 102 in the processor 100.

Referring now to FIG. 2, a block diagram illustrating in more detail the cache memory 132 of FIG. 1 is shown. The cache memory 132 includes a memory array 206 of storage entries and a controller 202 that includes utilization counters 204. The memory array 206 is arranged as M sets by N ways. In the example embodiment of FIG. 2, there are 16 ways and 128 sets, and the 128 sets are arranged in 8 set groups of 16 mutually exclusive sets in each group. It should be understood that the cache memory 132 that is configured to dynamically power the number of ways within set groups based on utilization trends may include more or fewer ways, sets, and sets within each set group.

The ways within each set group are separately powerable by the controller 202. In one embodiment, the controller 202 includes a respective way enable register for each set group (not shown). Each way enable register holds N bits associated with the N ways for specifying whether the way is powered on or off for the respective group. The controller 202 sets/clears the bits of the way enable register of a group in order to provide/remove power to/from ways of the group in order to reduce/increase the number of ways powered on for the group, as described below. In an alternate embodiment, the controller 202 includes a global way enable register and Q local way enable registers, where Q is less than N. Each local way enable register has an associated indicator that indicates which of the set groups is associated with the local way enable register. Each valid local way enable register controls the powering of the ways of the groups specified in the associated indicator, and the powering of the ways of groups not specified by a local way indicators are controlled by the global way indicator. Alternatively, the indicator associated with each local way enable register specifies a start and end group such that all groups included in the start and end specification are controlled by the associated local way enable register. These embodiments may be more size and power consumption efficient while providing sufficient power control, particularly in situations where a significant number of the groups have all or only one of their ways powered on. In one embodiment, ways within a group of sets are separately powerable in pairs by the controller 202. That is, the controller 202 provides/removes power two ways at a time within a group.

The storage entries of the memory array 206 store the data of cache lines and their associated status information, e.g., MESI state. In one embodiment, separate memory arrays store the data and status. Additionally, the array 206 includes storage elements per set for holding replacement information used to determine which way in the set will be allocated. The replacement information may also be held in a separate memory array from the data and/or status array.

The controller 202 monitors the utilization of the cache memory 132 to attempt to ascertain trends in the utilization over time by the programs the processor 100 is executing. As stated above, utilization trends include, but are not limited to, one or a combination of hit rate, average victim cache line age, number of cache lines prefetched but not used, and/or access frequency. Thus, the counters 204 may be used to store, for each set group, a number of cache hits to the set group, a number of accesses to the set group, and an age of the cache lines in the set group. The counters 204 may also include storage, such as bitmaps or shift registers, for storing other information, such as an indication of whether the cache lines of the set group were prefetched and whether the cache lines of the set group were used after being prefetched before being evicted. The controller 202 also holds various thresholds with which to compare the values stored in the counters 204, as described in more detail below. The controller 202 also includes logic for performing computations needed to monitor utilization of the set groups and make decisions about utilization trends. In one embodiment, rather than having a set of counters 204 for each set group, the controller 202 includes fewer sets of counters 204 which are shared in a time-multiplexed fashion by monitor the utilization trends of the different set groups.

Referring now to FIG. 3, a flowchart illustrating operation of the cache memory 132 of FIG. 2 to perform selective powering of ways of groups of sets is shown. Flow begins at block 301.

At block 301, the controller 202 initializes an index to zero. The index is referred to herein as J. Flow proceeds to block 302.

At block 302, the controller 202 initially provides power to all the ways of all the set groups of the cache memory 132. Flow proceeds to block 304.

At block 304, the controller 202 monitors one or more utilization trends of the current set group (group[J]). FIGS. 5 through 8 describe various embodiments of manners in which the controller 202 monitors the utilization trend of a set group as well as manners in which the controller 202 determines whether it would be beneficial to decrease or increase the number of powered-up ways of a set group (e.g., as at decision blocks 306 and 316). Flow proceeds to decision block 306.

At decision block 306, the controller 202 determines whether the utilization trend of the set group monitored at block 304 indicates that it would be beneficial to decrease the number of powered-up ways in the set group, e.g., to decrease power consumption in exchange for an acceptable loss in performance. If so, flow proceeds to block 308; otherwise, flow proceeds to decision block 316.

At block 308, the controller 202 decreases the number of powered-up ways of the set group. That is, the controller 202 powers down one or more of the currently powered-up ways of the set group, referred to as the target ways. An example is shown in FIG. 4 in which, for example, way 15 of set group 4 is powered-up at Time 1 but is then powered-down by the controller 202 at Time 2. Additionally, prior to powering down the target ways of the group, the controller 202 evicts all cache lines that have valid data in the target ways so that the valid data is not lost. Flow proceeds to block 322.

At decision block 316, the controller 202 determines whether the utilization trend of the set group monitored at block 304 indicates that it would be beneficial to increase the number of powered-up ways in the set group, e.g., to gain performance in exchange for an acceptable increase in power consumption. If so, flow proceeds to block 318; otherwise, flow proceeds to block 322.

At block 318, the controller 202 increases the number of powered-up ways of the set group. That is, the controller 202 powers up one or more of the currently powered-down ways of the set group, referred to as the target ways. An example is shown in FIG. 4 in which, for example, ways 5 and 6 of set group 5 are powered-down at Time 1 but are then powered-up by the controller 202 at Time 2. Additionally, after powering up the target ways of the group, the controller 202 invalidates the target ways. Flow proceeds to block 322.

At block 322, the controller 202 updates the index J to specify the next set group, which preferably includes incrementing J and wrapping around to zero when J reaches the number of set groups. Flow returns to block 304 to monitor the utilization of the next set group specified by the index.

Although FIG. 3 (and FIGS. 5 through 8) describe embodiments in which a single group is monitored and dynamically resized in a time-multiplexed fashion, in other embodiments more than one group may be monitored and dynamically resized in a time-multiplexed fashion, depending upon the availability of resources (e.g., counters 204) to perform the monitoring. Furthermore, in other embodiments the controller 202 includes sufficient resources (e.g., counters 204) to perform the monitoring and dynamic resizing for all the groups concurrently such that time-multiplexing is not necessary. For example, in the embodiment of FIG. 7 in which the number of prefetched cache lines that are not used is the monitored utilization trend, the amount of resources required may be relatively small such that it may be an advantageous tradeoff in terms of size and power consumption to include the monitoring and resizing hardware for all of the groups.

Preferably, the hit rate, the number cache lines prefetched but evicted without being used, the average victim cache line age, and access frequency described with respect to FIGS. 5 through 8 are measured over a rolling window of time that precedes the point in time at which the evaluation is made regarding re-sizing the set group.

Preferably, the thresholds are different in order to provide a hysteresis affect to avoid unnecessarily changing the size of the set group too frequently. This is particularly beneficial because, although there may be little if no performance cost associated with increasing the size of the group (although there may be power consumption cost), there may be significant performance cost associated with decreasing the size of the group because the valid cache lines in the target ways being powered-off must first be evicted.

Referring now to FIG. 4, a block diagram illustrating an example of the operation of the cache memory 132 of FIG. 2 to perform selective powering of ways of groups of sets according to the flowchart of FIG. 3 is shown.

As may be observed, FIG. 4 illustrates whether each of the ways of each of the set groups (of which there are 8 in the example) of the cache memory 132 is powered-up (greyed) or powered-down (white). FIG. 4 illustrates which ways of each set group are powered-up/down at two different points in time, denoted Time 1 and Time 2, in which Time 2 follows Time 1.

In the example of FIG. 4, at Time 1: set group 0 has ways 3-12 powered-up and ways 0-2 and 13-15 powered-down; set group 1 has ways 0-13 powered-up and ways 14-15 powered-down; set group 2 has ways 0-11 and 15 powered-up and ways 12-14 powered-down; set group 3 has ways 1-11 and 14-15 powered-up and ways 0 and 12-13 powered-down; set group 4 has ways 0-15 powered-up and no ways powered-down; set group 5 has ways 0-4 powered-up and ways 5-15 powered-down; set group 6 has ways 0-15 powered-up and no ways powered-down; set group 7 has ways 2-15 powered-up and ways 0-1 powered-down.

In the example of FIG. 4, at Time 2: set group 0 has ways 0 and 3-12 powered-up and ways 1-2 and 13-15 powered-down, i.e., way 0 was powered-up by the controller 202 thus increasing by one the number of ways powered-up; set group 1 has ways 0-14 powered-up and way 15 powered-down, i.e., way 14 was powered-up by the controller 202 thus increasing by one the number of ways powered-up; set group 2 has ways 1-11 and 15 powered-up and ways 1 and 12-14 powered-down, i.e., way 0 was powered-down by the controller 202 thus decreasing by one the number of ways powered-up; set group 3 has ways 1-11 and 14-15 powered-up and ways 0 and 12-13 powered-down, i.e., the controller 202 did not change the number of ways powered-up; set group 4 has ways 0-14 powered-up and way 15 powered-down, i.e., way 15 was powered-down by the controller 202 thus decreasing by one the number of ways powered-up; set group 5 has ways 0-6 powered-up and ways 7-15 powered-down, i.e., ways 5-6 were powered-up by the controller 202 thus increasing by two the number of ways powered-up; set group 6 has ways 0-15 powered-up and no ways powered-down, i.e., the controller 202 did not change the number of ways powered-up; set group 7 has ways 3-15 powered-up and ways 0-2 powered-down, i.e., way 2 was powered-down by the controller 202 thus decreasing by one the number of ways powered-up.

Although FIG. 4 illustrates an embodiment in which the sets within a set group appear contiguous to one another (i.e., set indices are sequential), other embodiments are contemplated in which the indices of the sets of a set group are non-sequential. For example, the indices of the sets within a set group may be those sets whose index modulo the number of groups are equal, e.g., assume 8 groups, then sets 3, 11, 19, etc. are in the same group.

In one embodiment, the cache memory 132 employs different replacement policies for different groups of ways within a set, as described in U.S. patent application Ser. No. 14/890,895, filed Nov. 12, 2015, which is a U.S. national stage application of PCT application No. PCT/IB2014/003261, filed Dec. 14, 2014, each of which is hereby incorporated by reference in its entirety for all purposes. The ability to provide power dynamically to ways separately within set groups of the cache memory 132 may be particularly useful and synergistic with such a cache memory 132.

Figure 5:
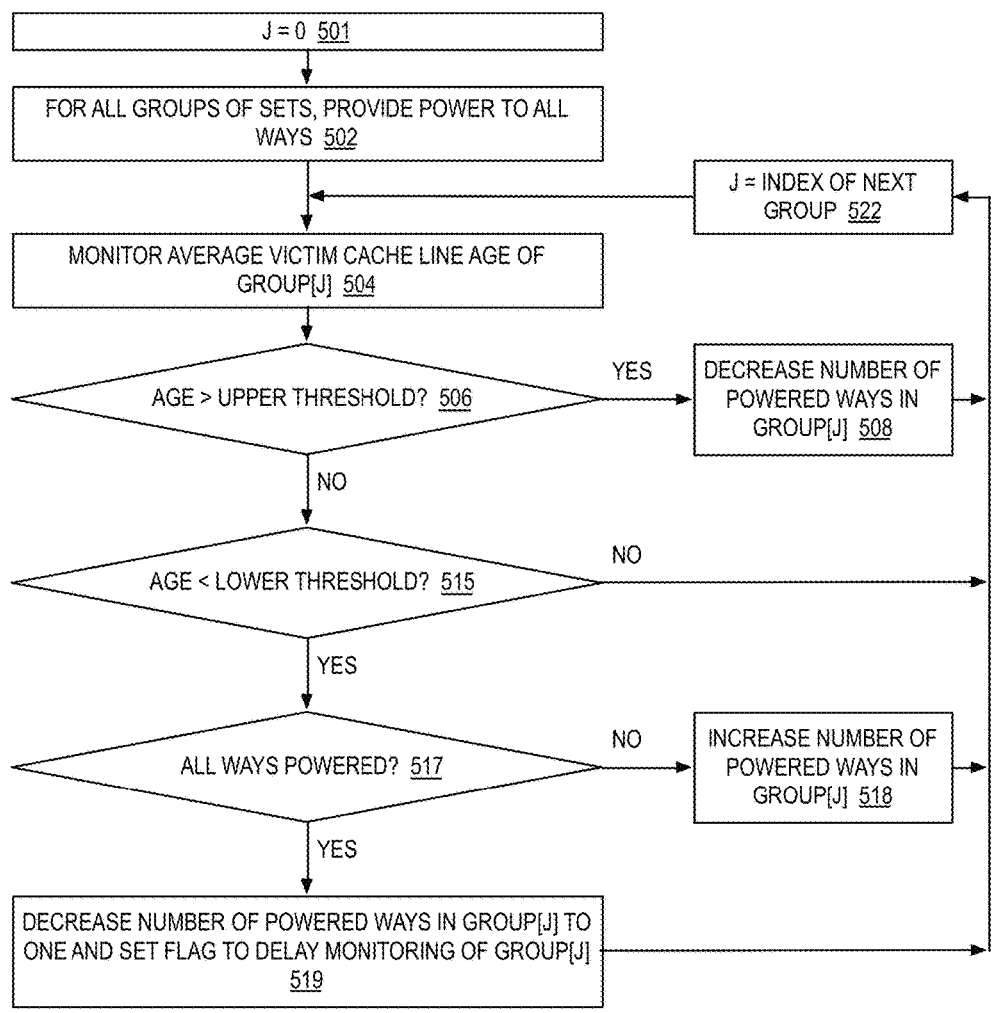
FIGS. 5 through 8 are flowcharts illustrating operation of the cache memory of FIG. 2 to perform selective powering of ways of groups of sets according to different embodiments.

Referring now to FIG. 5, a flowchart illustrating operation of the cache memory 132 of FIG. 2 to perform selective powering of ways of groups of sets is shown. The embodiment of FIG. 5 employs the average victim cache line age within a set group as a utilization trend for determining whether it may be beneficial to decrease or increase the number of ways powered-up for each set group. The victim age of a cache line is a measure of the time from when an entry in the cache memory 132 is allocated for the cache line to when the cache line is evicted from the cache memory 132. The victim age may be measured in terms of clock cycles of the cache memory 132, accesses to the cache memory 132, accesses to the set group, or other suitable time units. In one embodiment, the utilization counters 204 of FIG. 2 keep track of the victim age of cache lines in the current set group, and the controller 202 computes an average of the cache line victim ages at an appropriate event (e.g., at block 504), such as at the end of a predetermined time period, when a new set group is monitored (e.g., at each loop of the flowchart of FIG. 5), when the number of cache line evicted from the set group has reached a threshold, or other suitable event.

Generally speaking, if the average victim age for the set group is high, this may be taken as an indication that the group may be larger than necessary for the portion of the current data set that maps to the group and that if the group is decreased to a smaller number of ways to save power, the smaller group may still be sufficiently large to be hit rate efficient for the portion of the data set. Conversely, if the average victim age for the set group is low, this may be taken as an indication that the group is too small for the portion of the current data set that maps to the group and needs to be increased. However, if the average victim age for the set group is low but the group is already at its maximum size (i.e., all ways powered), this may be an indication that the portion of the data set is simply too large for the group and/or the nature of the accesses to the group is such that a smaller group size would be almost as hit rate efficient as the full size group and therefore power could be saved by significantly reducing the size of the group. For example, assume a program is streaming through a large data set such that eventually each new allocation of a cache line from the group causes an eviction of a cache line from the group that was only used once, which would be indicated by a small average victim cache line age. In this case, a group with a small number of ways would be almost as hit rate efficient as having the group with the maximum number of ways; hence, power may be saved by significantly reducing the number of ways of the group by powering them down. In one embodiment, this feature is captured at blocks 517 and 519 of FIG. 5. Flow begins at block 501.

At block 501, the controller 202 initializes an index to zero. The index is referred to herein as J. Flow proceeds to block 502.

At block 502, the controller 202 initially provides power to all the ways of all the set groups of the cache memory 132. Flow proceeds to block 504.

At block 504, the controller 202 monitors the average victim cache line age of the current set group (group[J]). Flow proceeds to decision block 506.

At decision block 506, the controller 202 determines whether the average victim cache line age of the set group monitored at block 504 is greater than an upper threshold, which in one embodiment is a predetermined value. If so, flow proceeds to block 508; otherwise, flow proceeds to decision block 515.

At block 508, the controller 202 decreases the number of powered-up ways of the set group. Additionally, prior to powering down the target ways of the group, the controller 202 evicts all cache lines that have valid data in the target ways so that the valid data is not lost. Flow proceeds to block 522.

At decision block 515, the controller 202 determines whether the average victim cache line age of the set group monitored at block 504 is less than a lower threshold, which in one embodiment is a predetermined value. If so, flow proceeds to decision block 517; otherwise, flow proceeds to block 518.

At decision block 517, the controller 202 determines whether all ways of the set group are currently powered-on. If so, flow proceeds to block 519; otherwise, flow proceeds to block 518.

At block 518, the controller 202 increases the number of powered-up ways of the set group. Additionally, after powering up the target ways of the group, the controller 202 invalidates the target ways. Flow proceeds to block 522.

At block 519, the controller 202 decreases the number of powered-up ways of the set group to a single way. In an alternate embodiment, the controller 202 decreases the number of powered-up ways of the set group to a small number of ways (e.g., two, three or four), rather than to a single way. Additionally, prior to powering down the target ways of the group, the controller 202 evicts all cache lines that have valid data in the target ways so that the valid data is not lost. Still further, the controller 202 insures that it waits at least a predetermined amount of time before it performs any re-sizing of the number of powered-up ways of the set group based on the average victim cache line age of the set group. Without the delay, the next time this set group is monitored (e.g., the next time around the loop for this set group), it is highly likely that the average victim cache line age will be less than the upper threshold (i.e., false at decision block 506), the average victim cache line age will be less than the lower threshold (i.e., true at decision block 515), and not all the ways will be powered-on (i.e., false at decision block 517), such that the controller 202 would increase the number of powered-on ways. However, it is desirable to keep the numbered of ways powered-up small as long as the condition exists described above, i.e., the portion of the data set is too large for the group and/or the nature of the accesses to the group is such that a smaller group size would be almost as hit rate efficient as the full size group. That is, it is not helpful to increase the number of ways as long as the condition exists. The delay may provide an opportunity for the condition to subside, e.g., streaming to finish. Without the delay, while the condition persists, the controller 202 might continually oscillate between all ways powered-up and a single way powered-up, i.e., quickly increase the number of powered-up ways (via block 518) each time through the loop of FIG. 5 until it reached all powered-up ways and then back down to the small number (via block 519), which is undesirable. In one embodiment, the controller 202 includes a flag for each set group that, if set, indicates to delay dynamic sizing for the set group, which flag the controller 202 clears after the at least the predetermined amount of time. Flow proceeds to block 522.

At block 522, the controller 202 updates the index J to specify the next set group, which preferably includes incrementing J and wrapping around to zero when J reaches the number of set groups. Flow returns to block 504 to monitor the average victim cache line age of the next set group specified by the index.

Figure 6:
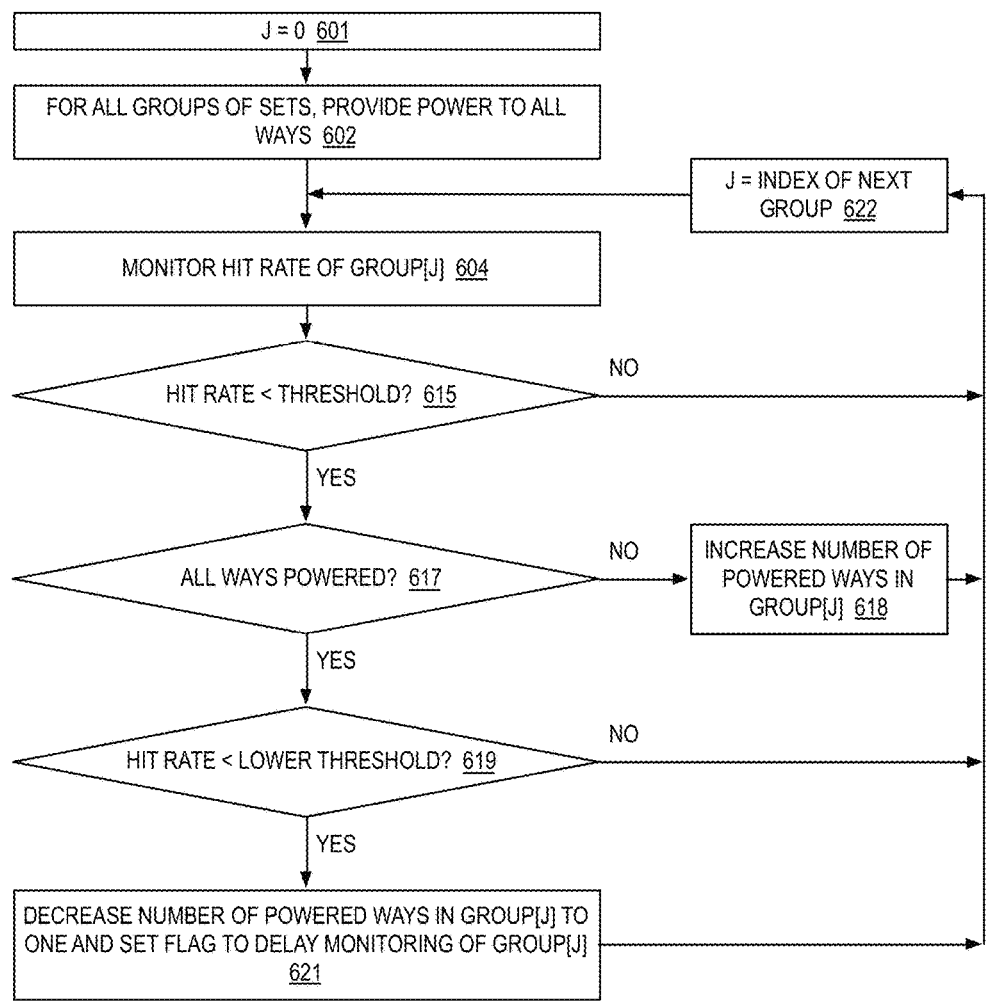

Referring now to FIG. 6, a flowchart illustrating operation of the cache memory 132 of FIG. 2 to perform selective powering of ways of groups of sets is shown. The embodiment of FIG. 6 employs the hit rate of a set group as a utilization trend for determining whether it may be beneficial to decrease or increase the number of ways powered-up for each set group. The hit rate of a set group is a ratio of the number of hits in the set group to the number of accesses to the set group. In one embodiment, the utilization counters 204 of FIG. 2 keep track of the number of hits in the current set group and the number of accesses to the current set group, and the controller 202 computes the hit rate at an appropriate event (e.g., at block 604), such as at the end of a predetermined time period, when a new set group is monitored (e.g., at each loop of the flowchart of FIG. 6), or other suitable event.

Generally speaking, if the hit rate for the set group is relatively low, this may be taken as an indication that the group may be too small for the portion of the current data set that maps to the group and that if the group is increased to a larger number of ways, the larger group may improve the hit rate for the portion of the data set. However, if the hit rate for the set group is very low and the group is already at its maximum size (i.e., all ways powered), this may be an indication that the portion of the data set is simply too large for the group and/or the nature of the accesses to the group is such that a smaller group size would be almost as hit rate efficient as the full size group and therefore power could be saved by significantly reducing the size of the group. As discussed above, a group with a small number of ways may be almost as hit rate efficient as having the group with the maximum number of ways; hence, power may be saved by significantly reducing the number of ways of the group by powering them down. In one embodiment, this feature is captured at blocks 617, 619 and 621 of FIG. 6. Flow begins at block 601.

At block 601, the controller 202 initializes an index to zero. The index is referred to herein as J. Flow proceeds to block 602.

At block 602, the controller 202 initially provides power to all the ways of all the set groups of the cache memory 132. Flow proceeds to block 604.

At block 604, the controller 202 monitors the hit rate of the current set group (group[J]). Flow proceeds to decision block 615.

At decision block 615, the controller 202 determines whether the hit rate of the set group monitored at block 604 is less than a first threshold, which in one embodiment is a predetermined value. If so, flow proceeds to decision block 617; otherwise, flow proceeds to block 622.

At decision block 617, the controller 202 determines whether all ways of the set group are currently powered-on. If so, flow proceeds to decision block 619; otherwise, flow proceeds to block 618.

At block 618, the controller 202 increases the number of powered-up ways of the set group. Additionally, after powering up the target ways of the group, the controller 202 invalidates the target ways. Flow proceeds to block 622.

At decision block 619, the controller 202 determines whether the hit rate of the set group monitored at block 604 is less than a second threshold that is less than the first threshold of block 615, which in one embodiment is also a predetermined value. If so, flow proceeds to block 621; otherwise, flow proceeds to block 622.

At block 621, the controller 202 decreases the number of powered-up ways of the set group to a single way. Additionally, prior to powering down the target ways of the group, the controller 202 evicts all cache lines that have valid data in the target ways so that the valid data is not lost. Still further, the controller 202 insures that it waits at least a predetermined amount of time before it performs any re-sizing of the number of powered-up ways of the set group based on the average victim cache line age of the set group, as described above. Flow proceeds to block 622.

At block 622, the controller 202 updates the index J to specify the next set group, which preferably includes incrementing J and wrapping around to zero when J reaches the number of set groups. Flow returns to block 604 to monitor the hit rate of the next set group specified by the index.

Figure 7:
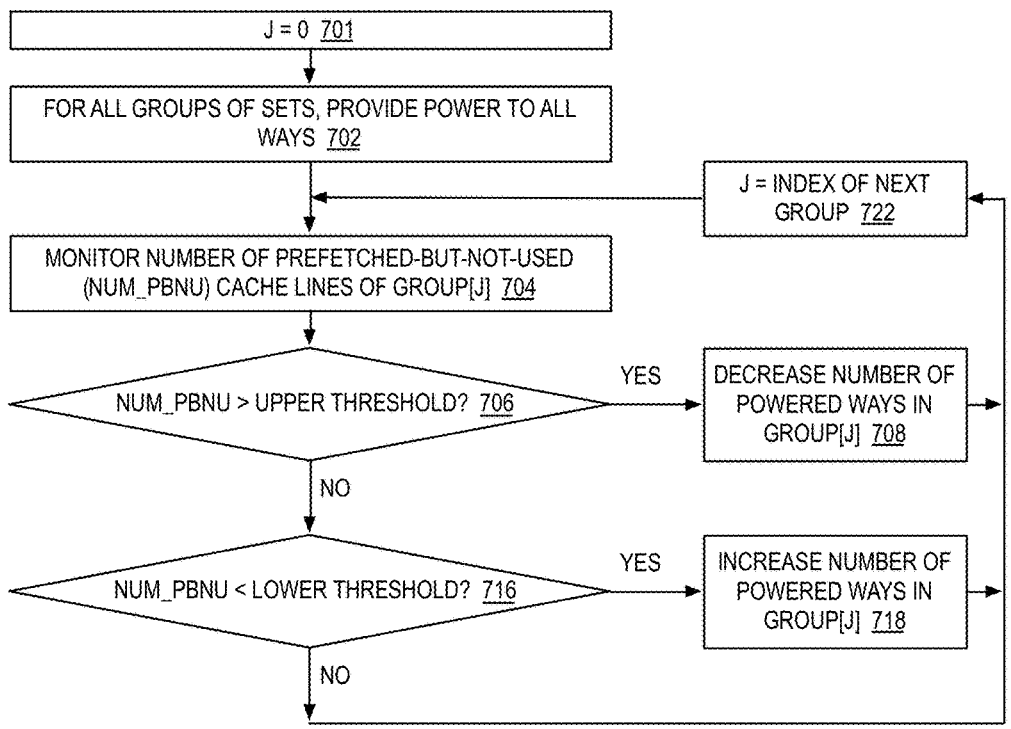

Referring now to FIG. 7, a flowchart illustrating operation of the cache memory 132 of FIG. 2 to perform selective powering of ways of groups of sets is shown. The embodiment of FIG. 7 employs the number of prefetched-but-not-used cache lines (referred to in FIG. 7 as NUM_PBNU) of a set group as a utilization trend for determining whether it may be beneficial to decrease or increase the number of ways powered-up for each set group. The NUM_PBNU of a set group is the number of cache lines in the set group that were allocated for a prefetch into the set group but were never subsequently used. In one embodiment, each of the cores 102 includes a data prefetcher that prefetches cache lines into the cache memory 132 based on patterns of memory accesses being made by the program executing on the core 102 and/or prefetch instructions included in the program that instruct the core 102 to prefetch cache lines.

In one embodiment, the controller 202 includes a counter 204 and bits for each set group. Each bit corresponds to a respective storage entry of the group. The bit is set when the entry is allocated by a prefetch (e.g., allocated by a data or instruction prefetcher of the processor 100) and is cleared when the entry is used by a demand load/store. When the cache line is evicted from the entry, if the bit is set, this indicates the allocation of the prefetched cache line was wasteful since the prefetched cache line was never used, so the controller 202 increments the group counter 204. If the counter 204 reaches a predetermined threshold, this may be a utilization trend that indicates the number of ways should be reduced to save power. In one embodiment, the bits are held in a tag array of the cache memory 132. In one embodiment, the controller 202 includes a counter 204 for each set of the group, and the controller 202 reduces the number of ways powered (e.g., at block 708) only if it determines that the counters 204 for all of the sets of the group exceed the threshold (e.g., at decision block 706). In one embodiment, the utilization counters 204 of FIG. 2 keep track of the NUM_PBNU of the current set group, and the controller 202 examines the NUM_PBNU at an appropriate event (e.g., at block 704), such as at the end of a predetermined time period, when a new set group is monitored (e.g., at each loop of the flowchart of FIG. 7), or other suitable event.

At block 701, the controller 202 initializes an index to zero. The index is referred to herein as J. Flow proceeds to block 702.

At block 702, the controller 202 initially provides power to all the ways of all the set groups of the cache memory 132. Flow proceeds to block 704.

At block 704, the controller 202 monitors the NUM_PBNU of the current set group (group[J]). Flow proceeds to decision block 706.

At decision block 706, the controller 202 determines whether the NUM_PBNU of the set group monitored at block 704 is greater than an upper threshold, which in one embodiment is a predetermined value. If so, flow proceeds to block 708; otherwise, flow proceeds to decision block 716.

At block 708, the controller 202 decreases the number of powered-up ways of the set group. Additionally, prior to powering down the target ways of the group, the controller 202 evicts all cache lines that have valid data in the target ways so that the valid data is not lost. Flow proceeds to block 722.

At decision block 716, the controller 202 determines whether the NUM_PBNU of the set group monitored at block 704 is less than a lower threshold, which in one embodiment is a predetermined value smaller than the upper threshold to provide hysteresis. If so, flow proceeds to block 718; otherwise, flow proceeds to block 722.

At block 718, the controller 202 increases the number of powered-up ways of the set group. Additionally, after powering up the target ways of the group, the controller 202 invalidates the target ways. Flow proceeds to block 722.

At block 722, the controller 202 updates the index J to specify the next set group, which preferably includes incrementing J and wrapping around to zero when J reaches the number of set groups. Flow returns to block 704 to monitor the NUM_PBNU of the next set group specified by the index.

Figure 8:
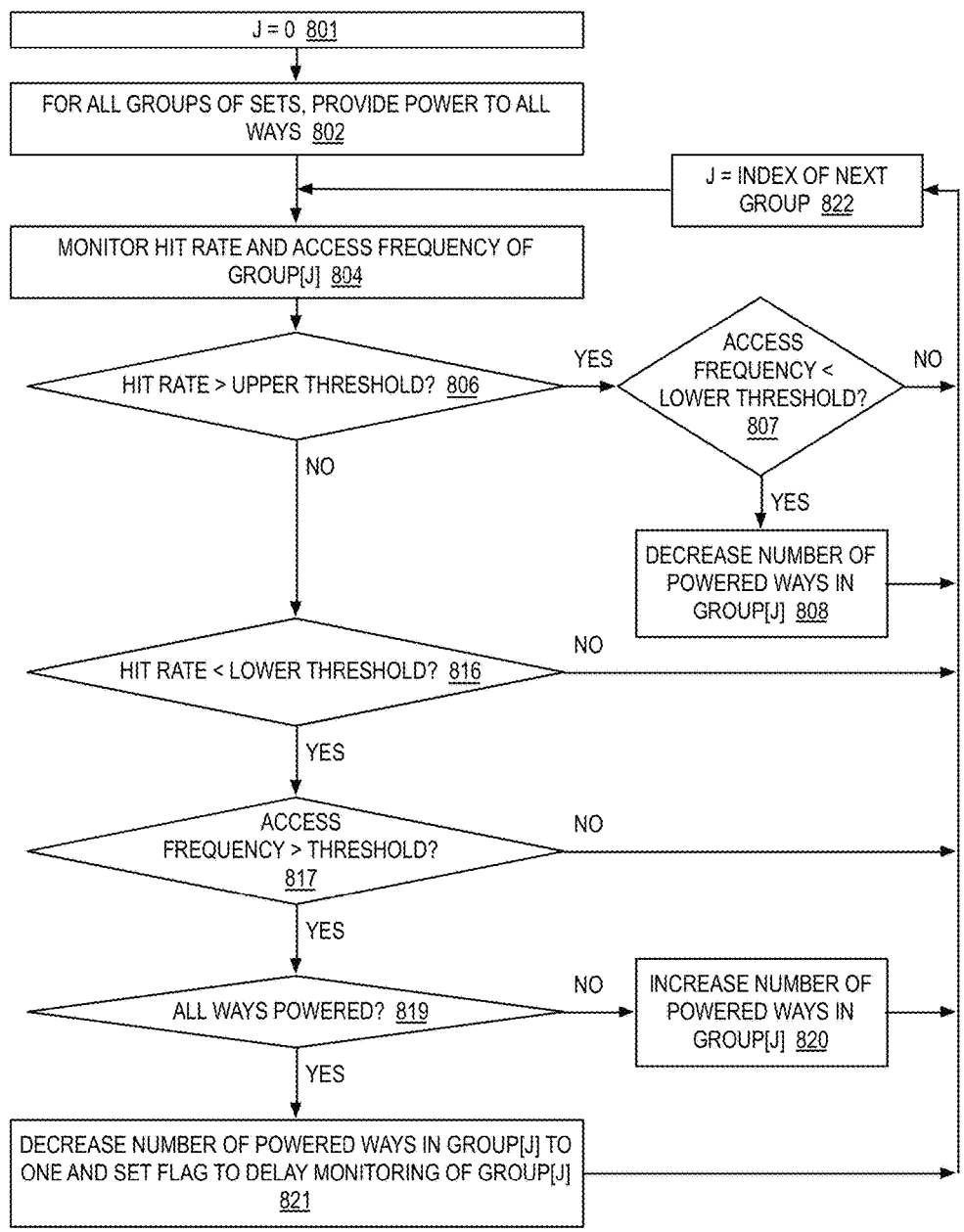

Referring now to FIG. 8, a flowchart illustrating operation of the cache memory 132 of FIG. 2 to perform selective powering of ways of groups of sets is shown. Like the embodiment of FIG. 6, the embodiment of FIG. 8 also employs the hit rate of a set group as a utilization trend for determining whether it may be beneficial to decrease or increase the number of ways powered-up for each set group. However, the embodiment of FIG. 8 further employs the access frequency to the set group as a utilization trend along with the hit rate. The access frequency of a set group is a measure of the rate of accesses to the set group. In one embodiment, the controller 202 uses the number of accesses to the current set group to compute not only the hit rate, but also the access frequency, at an appropriate event (e.g., at block 804), such as at the end of a predetermined time period, when a new set group is monitored (e.g., at each loop of the flowchart of FIG. 8), or other suitable event.

Generally speaking, as stated above, if the hit rate for the set group is relatively low, this would typically indicate a need to increase the number of powered-up ways of the set group (unless all the ways were already powered-up, as also discussed above). However, if the access frequency of the set group is very low, then it may not be worth doing so because the accesses are so infrequent that the power savings of a smaller set group may outweigh the relatively small performance benefit of potentially increased cache hit rate. Still further, if the access frequency is very low and the hit rate is high (implying a relatively large set group), it may be beneficial to reduce the number of powered-up ways of the set group because the power savings of a smaller set group may outweigh the relatively small performance benefit of a high cache hit rate. Flow begins at block 801.

At block 801, the controller 202 initializes an index to zero. The index is referred to herein as J. Flow proceeds to block 802.

At block 802, the controller 202 initially provides power to all the ways of all the set groups of the cache memory 132. Flow proceeds to block 804.

At block 804, the controller 202 monitors the hit rate and access frequency of the current set group (group[J]). Flow proceeds to decision block 806.

At decision block 806, the controller 202 determines whether the hit rate of the set group monitored at block 804 is greater than an upper hit rate threshold, which in one embodiment is a predetermined value. If so, flow proceeds to decision block 807; otherwise, flow proceeds to decision block 816.

At decision block 807, the controller 202 determines whether the access frequency of the set group monitored at block 804 is less than a lower access frequency threshold, which in one embodiment is a predetermined value. If so, flow proceeds to block 808; otherwise, flow proceeds to block 822.

At block 808, the controller 202 decreases the number of powered-up ways of the set group. Additionally, prior to powering down the target ways of the group, the controller 202 evicts all cache lines that have valid data in the target ways so that the valid data is not lost. Flow proceeds to block 822.

At decision block 816, the controller 202 determines whether the hit rate of the set group monitored at block 804 is less than a lower hit rate threshold, which in one embodiment is a predetermined value. If so, flow proceeds to decision block 817; otherwise, flow proceeds to block 822.

At decision block 817, the controller 202 determines whether the access frequency of the set group monitored at block 804 is greater than a higher access frequency threshold, which in one embodiment is a predetermined value. If so, flow proceeds to decision block 819; otherwise, flow proceeds to block 822.

At decision block 819, the controller 202 determines whether all ways of the set group are currently powered-on. If so, flow proceeds to block 821; otherwise, flow proceeds to block 820.

At block 820, the controller 202 increases the number of powered-up ways of the set group. Additionally, after powering up the target ways of the group, the controller 202 invalidates the target ways. Flow proceeds to block 822.

At block 821, the controller 202 decreases the number of powered-up ways of the set group to a single way. Additionally, prior to powering down the target ways of the group, the controller 202 evicts all cache lines that have valid data in the target ways so that the valid data is not lost. Still further, the controller 202 insures that it waits at least a predetermined amount of time before it performs any re-sizing of the number of powered-up ways of the set group based on the average victim cache line age of the set group, as described above. Flow proceeds to block 822.

At block 822, the controller 202 updates the index J to specify the next set group, which preferably includes incrementing J and wrapping around to zero when J reaches the number of set groups. Flow returns to block 804 to monitor the hit rate of the next set group specified by the index.

Various embodiments are contemplated in which the granularity of a set group varies. For example, in the embodiment of FIG. 2, the sets are grouped into eight mutually exclusive groups, each set group having 16 ways, thereby allowing for up to 128 separately powerable set-group-ways. However, other embodiments are contemplated with different numbers of mutually exclusive groups to allow for more or less separately powerable ways. In one embodiment, each set may be its own mutually exclusive group such that each entry in the L2 cache 124 may be a set-group-way. It is noted that the larger the number of groups the more fine-grained the L2 cache 124 may be budgeted to tailor it towards the needs of the analyzed program, whereas the fewer the number of groups the less control bits are needed to describe the set-group-way characteristics. In one embodiment, the number of sets in a group is 32, although other embodiments are contemplated in which the number of sets in a group is more or less.

Although embodiments are described in which the cache memory whose ways within groups of sets are selectively powered is a cache memory shared by multiple processor cores, other embodiments are contemplated in which the cache memory is dedicated to an individual core, or shared by fewer than all the cores of the processor. Furthermore, although embodiments are described in which the cache memory whose ways within groups of sets are selectively powered is a cache memory at a particular level in the cache memory hierarchy of the processor (e.g., level-3), other embodiments are contemplated in which the cache memory is at a different level (e.g., level-1, level-2). Additionally, various embodiments are described that employ predetermined threshold values. In one embodiment, one or more of the predetermined threshold values are user-programmable, e.g., by the operating system or other system software. In one embodiment, one or more of the predetermined threshold values are fabricated into the controller 202, for example in hardwired logic, fuses that may be blowable (i.e., updatable), and/or microcode of the processor 100 that may be patchable.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A set associative cache memory, comprising:
an M×N memory array of storage entries arranged as M sets by N ways, both M and N are integers greater than one;
within each group of P mutually exclusive groups of the M sets, the N ways are separately powerable; and
a controller that, for each group of the P groups, monitors a utilization trend of the group and dynamically causes power to be provided to a different number of ways of the N ways of the group during different time instances based on the utilization trend,
wherein the utilization trend of the group comprises a hit rate of the group,
wherein the controller causes power to be provided to a smaller number of ways of the N ways of the group when the hit rate of the group is below a second predetermined hit rate threshold and the number of ways of the group to which the controller is currently causing power to be provided is all the N ways of the group, and
wherein the controller causes power to be provided to a larger number of ways of the N ways of the group when the hit rate of the group is below a first predetermined hit rate threshold and the number of ways of the group to which the controller is currently causing power to be provided is less than all the N ways of the group, wherein the first predetermined hit rate threshold is higher than the second predetermined hit rate threshold.

2. The cache memory of claim 1, further comprising:
the utilization trend of the group further comprises an access frequency of the group.

3. The cache memory of claim 2, further comprising: the controller causes power to be provided to a smaller number of ways of the N ways of the group when the hit rate of the group is above a fourth predetermined hit rate threshold and the access frequency of the group is less than a first predetermined access frequency threshold.

4. The cache memory of claim 2, further comprising:
the controller causes power to be provided to a smaller number of ways of the N ways of the group when the hit rate of the group is below a third predetermined hit rate threshold and the access frequency of the group is greater than a second predetermined access frequency threshold and the number of ways of the group to which the controller is currently causing power to be provided is all the N ways of the group.

5. The cache memory of claim 2, further comprising:
the controller causes power to be provided to a larger number of ways of the N ways of the group when the hit rate of the group is below the third predetermined hit rate threshold and the access frequency of the group is greater than the second predetermined access frequency threshold and the number of ways of the group to which the controller is currently causing power to be provided is less than all the N ways of the group.

6. The cache memory of claim 1, further comprising:
the utilization trend of the group comprises a measure of a number of storage entries in the group into which a cache line was prefetched but the cache line was evicted without being used.

7. The cache memory of claim 6, further comprising:
the controller causes power to be provided to a smaller number of ways of the N ways of the group when the number of storage entries in the group into which a cache line was prefetched but the cache line was evicted without being used is above a first predetermined entry number threshold.

8. The cache memory of claim 6, further comprising:
the controller causes power to be provided to a larger number of ways of the N ways of the group when the number of storage entries in the group into which a cache line was prefetched but the cache line was evicted without being used is below a second predetermined entry number threshold.

9. The cache memory of claim 1, further comprising:
the utilization trend of the group comprises an average victim cache line age of the group.

10. The cache memory of claim 9, further comprising:
the controller causes power to be provided to a smaller number of ways of the N ways of the group when the average victim cache line age of the group is above a first predetermined age threshold.

11. The cache memory of claim 9, further comprising:
the controller causes power to be provided to a larger number of ways of the N ways of the group when the average victim cache line age of the group is below a second predetermined age threshold and the number of ways of the group to which the controller is currently causing power to be provided is less than all the N ways of the group.

12. The cache memory of claim 9, further comprising:
the controller causes power to be provided to a smaller number of ways of the N ways of the group when the average victim cache line age of the group is below a second predetermined age threshold and the controller is currently causing power to be provided to all of the N ways of the group.

13. The cache memory of claim 1, further comprising:
the controller includes counters for monitoring the utilization trend of only Q of the P groups, Q is less than P; and
the controller monitors the utilization trend of different collections of Q groups of the P groups in a time-multiplexed fashion.

14. A method for operating a set associative cache memory having an M×N memory array of storage entries arranged as M sets by N ways, both M and N are integers greater than one, within each group of P mutually exclusive groups of the M sets, the N ways are separately powerable, the method comprising:
for each group of the P groups:
monitoring a utilization trend of the group, wherein the utilization trend of the group comprises a hit rate of the group; and
during different time instances, dynamically causing power to be provided to a smaller number of ways of the N ways of the group when the hit rate of the group is below a second predetermined hit rate threshold and the number of ways of the group to which power is currently being provided is all the N ways of the group, and
dynamically causing power to be provided to a larger number of ways of the N ways of the group when the hit rate of the group is below a first predetermined hit rate threshold and the number of ways of the group to which power is currently being provided is less than all the N ways of the group, wherein the first predetermined hit rate threshold is higher than the second predetermined hit rate threshold.

15. The method of claim 14, wherein the utilization trend of the group further comprises an access frequency of the group, the method further comprising:
dynamically causing power to be provided to a smaller number of ways of the N ways of the group when the hit rate of the group is below a third predetermined hit rate threshold and the access frequency of the group is greater than a second predetermined access frequency threshold and the number of ways of the group to which power is currently being provided is all the N ways of the group.

16. The method of claim 14, wherein the utilization trend of the group further comprises an access frequency of the group, the method further comprising:
dynamically causing power to be provided to a larger number of ways of the N ways of the group when the hit rate of the group is below the third predetermined hit rate threshold and the access frequency of the group is greater than the second predetermined access frequency threshold and the number of ways of the group to which power is currently being provided is less than all the N ways of the group.

17. The method of claim 14, wherein the utilization trend of the group further comprises an average victim cache line age of the group, the method further comprising:
dynamically causing power to be provided to a smaller number of ways of the N ways of the group when the average victim cache line age of the group is below a second predetermined age threshold and the number of ways of the group to which power is currently being provided is all the N ways of the group.

18. A processor, comprising:
a plurality of processing cores;
the cache memory of claim 1, coupled to the plurality of processing cores.

* * * * *